United States Patent
Hara et al.

(10) Patent No.: US 12,022,283 B2
(45) Date of Patent: Jun. 25, 2024

(54) COMMUNICATION SYSTEMS, TERMINALS, COMMUNICATION METHODS, AND PROGRAMS

(71) Applicant: NIPPON TELEGRAPH AND TELEPHONE CORPORATION, Tokyo (JP)

(72) Inventors: Kazutaka Hara, Musashino (JP); Tomohiro Taniguchi, Musashino (JP); Ryota Shiina, Musashino (JP); Tomoki Murakami, Musashino (JP); Toshiro Nakahira, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 369 days.

(21) Appl. No.: 17/624,513

(22) PCT Filed: Jul. 4, 2019

(86) PCT No.: PCT/JP2019/026744
§ 371 (c)(1),
(2) Date: Jan. 3, 2022

(87) PCT Pub. No.: WO2021/002023
PCT Pub. Date: Jan. 7, 2021

(65) Prior Publication Data
US 2022/0360984 A1  Nov. 10, 2022

(51) Int. Cl.
*H04B 10/00* (2013.01)
*H04B 10/2575* (2013.01)
(Continued)

(52) U.S. Cl.
CPC ...... *H04W 12/06* (2013.01); *H04B 10/25752* (2013.01); *H04B 10/54* (2013.01)

(58) Field of Classification Search
CPC .............. H04B 10/11; H04B 10/25752; H04B 10/25753; H04B 10/112; H04B 10/1121;
(Continued)

(56) References Cited

U.S. PATENT DOCUMENTS

| 2009/0067846 | A1* | 3/2009 | Yu | H04B 10/1143 398/128 |
| 2018/0139202 | A1* | 5/2018 | Sethi | H04W 84/12 |
| 2020/0382958 | A1* | 12/2020 | Wang | H04W 12/06 |

OTHER PUBLICATIONS

Akira Yamada et al., Trends in international standardization of wireless LAN related systems, Institute of Electronics, Information and Communication Engineers Communication Society Magazine, No. 38, Autumn issue, 2016, pp. 74-79.
(Continued)

*Primary Examiner* — Hanh Phan
(74) *Attorney, Agent, or Firm* — Harness, Dickey & Pierce, P.L.C.

(57) ABSTRACT

An objective is to provide a communication system, a terminal, a communication method, and a program capable of improving the probability of successful authentication regardless of mobility of the terminal.
The communication system according to the present invention includes a terminal 30 including: a sensor unit 36 that senses a state of the terminal and includes at least one of an acceleration sensor, a gyro sensor, a position sensor, and a proximity sensor; an optical receiver 31 that receives an optical modulation signal and outputs an electrical signal; a correction circuit 34 that corrects the electrical signal on a basis of the state of the terminal sensed by the sensor unit 36 when one of the following is true: illuminance of light received from an optical transmitter 21 by the optical receiver 31 is equal to or lower than an illuminance threshold value; and a signal intensity of the electrical signal output by the optical receiver 31 is equal to or lower than an
(Continued)

intensity threshold value; an authentication information checking circuit 32 that checks the authentication information contained in the electrical signal; and a terminal-side RF transmitter/receiver 33 that transmits the authentication information to a base station 20 via RF wireless communication.

8 Claims, 8 Drawing Sheets

(51) Int. Cl.
*H04B 10/54* (2013.01)
*H04W 12/06* (2021.01)

(58) Field of Classification Search
CPC ............ H04B 10/1123; H04B 10/1125; H04B 10/1127; H04B 10/1129; H04B 10/114; H04B 10/1141; H04B 10/1143; H04B 10/1149; H04B 10/116; H04B 10/118; H04B 10/0795; H04W 12/06
USPC ....... 398/118, 119, 127, 128, 129, 130, 131, 398/172, 115, 116, 117, 33, 38, 158, 159, 398/135, 136
See application file for complete search history.

(56) References Cited

OTHER PUBLICATIONS

Mengjie Zhang et al., 4.05-Gb/s RGB LED-based VLC system utilizing PS-Manchester coded Nyquist PAM-8 modulation and hybrid time-frequency domain equalization, OFC2017, Mar. 19, 2017.
Wen-Shing Tsai et al., A 50 m/320 Gbps DWDM FSO communication, IEEE Photonics Conference (IPC), Oct. 2, 2016, pp. 43-44.

* cited by examiner

[3] ILLUMINANCE AT THE TIME OF RECEPTION = A [lux]

| TILT FROM STATE INITIAL VALUE (deg) | CORRECTION PERCENTAGE(%) | CORRECTION VALUE |
|---|---|---|
| 1 | a | B × (1+a/100) |
| 2 | b | B × (1+b/100) |
| 3 | c | B × (1+c/100) |
| 4 | d | B × (1+d/100) |
| ... | ... | ... |
| 180 | - | - |

B DENOTES INTENSITY OF ELECTRICAL SIGNAL OR SENSITIVITY OF OPTICAL RECEIVER OBSERVED WHEN LIGHT IS RECEIVED WITH ILLUMINANCE A

COMMUNICATION SYSTEMS, TERMINALS, COMMUNICATION METHODS, AND PROGRAMS

CROSS-REFERENCE TO RELATED APPLICATIONS

This application is a 371 U.S. National Phase of International Application No. PCT/JP2019/026744 filed on Jul. 4, 2019. The entire disclosure of the above application is incorporated herein by reference.

TECHNICAL FIELD

The present disclosure is related to optical/RF wireless hybrid communication between a base station and a terminal.

BACKGROUND ART

In the present disclosure, the direction from a base station to a terminal will be referred to as "downstream", whereas the direction from a terminal to a base station will be referred to as "upstream". High-speed Internet services using Fiber-To-The-Home (FTTH) or Long Term Evolution (LTE) are indispensable tools in our daily lives. In recent years, in particular, as the use of clouds becomes popular and the use of mobile terminals expands, a wide variety of applications and services in addition to IP data communication have quickly become available, such as Internet of Things/Machine to Machine (IoT/M2M), 4K/8K high resolution video distribution services, online video distribution services, and video uploading using SNSs. Further, new working styles such as remote work using ICT have been proposed. It is therefore expected that the demand for services using networks will keep growing in the future. At present, as FTTH has widely spread, stable optical broadband services are provided to residences; however, in residential environments, because of the use of multi-devices other than PCs and for reasons related to routing cable wirings and the abovementioned background having a variety of services, wireless communication methods (wireless communication systems) are the mainstream.

From a perspective of frequency ranges, wireless communication systems can roughly be divided into two groups by using 3 THz as a boundary. The frequency band equal to or lower than 3 THz is called a radio wave range, and examples include cellular-based systems (e.g., LTE and 5G) and wireless LANs using unlicensed bands. Research and development are active for this range, and it is possible to realize high throughput by expanding the frequency band being used and by using a high frequency band (see Non-Patent Literature 1, for example).

In contrast, the frequency band equal to or higher than 3 THz (equal to or lower than 30 PHz) is called a light wave range, and examples include methods using infrared communication and visible light, and Li-Fi developed in recent years by which LEDs used for illumination undergo high-speed modulation so as to serve in transmission and reception. Still being at a research stage are Wavelength Division Multiplexing (WDM) using LEDs with incoherent light, an experiment to transmit 1 m/4 Gbps using 8-PAM, and a report on 50 m/320 Gbps using 8-wavelength Dense WDM (DWDM) at 50 GHz intervals of coherent light (see Non-Patent Literature 2 and 3, for example).

Wireless communication systems in the radio wave range and in the light wave range have the following characteristics due to differences in the frequency bands being used.

Wireless communication systems in the light wave range:
(a) Extremely high directionality (Having a small coverage area (where the communication is possible))
(b) Being visually recognizable (Being visible)

Wireless communication systems in the radio wave range:
(c) Diffraction and penetration are possible (Having a wide coverage area)
(d) Being invisible These characteristics form pairs ((a) and (c); and (b) and (d)). Accordingly, from perspectives of stability of the communication, limitation on communication areas, and safety of the communication, for example, it is considered possible to use a hybrid system of: a radio wave and a light wave that complement the characteristics of each other. Such a system has already been published. For example, Patent Literature 1 discloses a hybrid system of a VLC (visible light) light source and Wi-Fi that enhances convenience of Wi-Fi for end users and that makes Wi-Fi communication possible only in a specific area. In this hybrid system, network access information (authentication information), such as an SSID, a Password/PMK, a BSSID, and a channel, is transmitted from the VLC light source to a terminal. Further, the terminal receives the authentication information by using an optical detector and transmits, via Wi-Fi, the authentication information to an authentication server that performs authentication. After the authentication is completed, the hybrid system establishes communication between the terminal and the network.

CITATION LIST

Patent Literature

Patent Literature 1: United States Patent Publication No. US2018/019202

Non-Patent Literature

Non-Patent Literature 1: Yamada, A., Nojima, D. and Asai, T., "Musen LAN Kanren System no Kokusai Hyoujunka Doukou" ("Trends in Global Standardization of Systems Related to Wireless LANs" in Japanese), 2016, vol. 10, no. 2, pp. 74-79.

Non-Patent Literature 2: Mengjie Zhang, Meng Shi, Fumin Wang, Jiaqi Zhao, Yingjun Zhou, Zhixin Wang, Nan Chi, "4.05-Gb/s RGB LED-based VLC system utilizing PS-Manchester coded Nyquist PAM-8 modulation and hybrid time-frequency domain equalization" W2A. 42, Proc OFC 2017.

Non-Patent Literature 3: Wen-Shing Tsai, Hai-Han Lu, Chung-Yi Li, Ting-Chieh Lu, Hung-Hsien Lin, Bo-Rui Chen, Chang-Jen Wu, "A 50 m/320 Gbps DWDM FSO communication" 2016, IEEE Photonics Conference (IPC), pp. 43-44.

SUMMARY OF THE INVENTION

Technical Problem

However, in hybrid systems such as the one disclosed in Patent Literature 1, reception characteristics for the authentication information significantly vary depending on the distance between the VLC light source and the optical detector provided on the terminal side, as well as the angle or the tilt between the VLC light source and the optical detector provided on the terminal side. When the reception characteristics become deteriorated, an authentication error occurs. Accordingly, when mobility of the terminal is taken into consideration, it is expected that such an "authentication error" occurs frequently. In other words, hybrid systems such as the one disclosed in Patent Literature 1 have a problem where it is difficult to improve the probability of successful authentication because of the mobility of the terminal.

To solve this problem, it is an objective of the present invention to provide a communication system, a terminal, a communication method, and a program capable of improving the probability of successful authentication regardless of the mobility of the terminal.

Means for Solving the Problem

To achieve the abovementioned objective, a communication system of the present invention is configured so that, when a terminal receives an optical signal via optical wireless communication, a group of sensors installed in the terminal obtains a feature amount of the terminal, so as to correct a reception signal on the basis of the feature amount.

Specifically, a communication system according to the present invention is a communication system in which a base station and a terminal communicate with each other via optical wireless communication and Radio Frequency (RF) wireless communication, wherein the base station includes:
an optical transmitter that transmits, as an optical modulation signal, authentication information for permitting communication via the RF wireless communication to the terminal via the optical wireless communication;
a base-station-side RF transmitter/receiver that receives the authentication information transmitted from the terminal via the RF wireless communication and that transmits and receives communication data communicated between the terminal and a network to and from the terminal via the RF wireless communication; and
an authentication information control circuit that authenticates the terminal which transmitted the authentication information and that permits communication between the authenticated terminal and the network, and the terminal includes:
a sensor unit that senses a state of the terminal and includes at least one of an acceleration sensor, a gyro sensor, a position sensor, and a proximity sensor;
an optical receiver that receives the optical modulation signal and outputs an electrical signal;
a correction circuit that corrects the electrical signal on a basis of the state of the terminal sensed by the sensor unit when one of the following is true: illuminance of light received from the optical transmitter by the optical receiver is equal to or lower than an illuminance threshold value; and a signal intensity of the electrical signal output by the optical receiver is equal to or lower than an intensity threshold value;
an authentication information checking circuit that checks the authentication information contained in the electrical signal; and
a terminal-side RF transmitter/receiver that transmits the authentication information to the base station via the RF wireless communication and that transmits and receives communication data communicated with the network to and from the base station via the RF wireless communication.

Further, a terminal according to the present invention is a terminal that communicates with a base station via optical wireless communication and RF wireless communication, the terminal including:
a sensor unit that senses a state of the terminal itself and includes at least one of an acceleration sensor, a gyro sensor, a position sensor, and a proximity sensor;
an optical receiver that receives an optical modulation signal being transmitted from the base station via the optical wireless communication and containing authentication information for permitting communication via the RF wireless communication and that outputs an electrical signal;
a correction circuit that corrects the electrical signal on a basis of the state or the terminal sensed by the sensor unit when one of the following is true: illuminance of light received from the optical transmitter by the optical receiver is equal to or lower than an illuminance threshold value; and a signal intensity of the electrical signal output by the optical receiver is equal to or lower than an intensity threshold value;
an authentication information checking circuit that checks the authentication information contained in the electrical signal; and
a terminal-side RF transmitter/receiver that transmits the authentication information to the base station via the RF wireless communication and that transmits and receives communication data communicated with the network to and from the base station via the RF wireless communication.

Furthermore, a communication method according to the present invention is a communication method for causing a base station and a terminal to communicate with each other via optical wireless communication and RF wireless communication, the communication method including:
causing authentication information for permitting communication via the RF wireless communication to be transmitted as an optical modulation signal from the base station to the terminal via the optical wireless communication;
sensing a state of the terminal which performs a photoelectric conversion to convert the optical modulation signal into an electrical signal, by using a sensor unit that is provided for the terminal and that includes at least one of an acceleration sensor, a gyro sensor, a position sensor, and a proximity sensor;
correcting the electrical signal on a basis of the state of the terminal when one of the following is true: illuminance of light of the optical modulation signal is equal to or lower than an illuminance threshold value; and a signal intensity of the electrical signal is equal to or lower than an intensity threshold value;
extracting the authentication information from the corrected electrical signal and causing the authentication information to be transmitted from the terminal to the base station via the RF wireless communication; and
causing the base station that received the authentication information transmitted from the terminal via the RF wireless communication to authenticate the terminal that transmitted the authentication information and to permit communication between the authenticated terminal and a network.

Even when the illuminance (hereinafter, "reception illuminance") of the optical signal from the base station received at the optical receiver of the terminal is lowered due to the state (a posture) of the terminal, it is possible, by correcting the electrical signal resulting from the photoelectric conversion performed on the optical signal, to obtain the authentication information contained in the electrical signal. It is therefore possible to avoid authentication errors. Consequently, the present invention is able to provide a communication system, a terminal, and a communication method capable of improving the probability of successful authentication regardless of the mobility of the terminal.

The correction circuit of the terminal in the communication system according to the present invention uses, as an illuminance value, illuminance of the light observed either when the illuminance of the light received from the optical transmitter by the optical receiver is largest or when the signal intensity of the electrical signal output by the optical receiver is largest, the correction circuit uses, as a state initial value, a sensed value sensed by the sensor unit either when the illuminance of the light received from the optical transmitter by the optical receiver is largest or when the signal intensity of the electrical signal output by the optical receiver is largest, the correction circuit sets the illuminance threshold value on a basis of the illuminance initial value, and the correction circuit corrects the electrical signal on a basis of a difference between the state of the terminal itself sensed by the sensor unit and the state initial value.

Further, the correction circuit of the terminal of the present invention uses, as an illuminance initial value, illuminance of the light observed either when the illuminance of the light received from the optical transmitter by the optical receiver is largest or when the signal intensity of the electrical signal output by the optical receiver is largest, the correction circuit uses, as a state initial value, a sensed value sensed by the sensor unit either when the illuminance of the light received from the optical transmitter by the optical receiver is largest or when the signal intensity of the electrical signal output by the optical receiver is largest, the correction circuit sets the illuminance threshold value on a basis of the illuminance initial value, and the correction circuit corrects the electrical signal on a basis of a difference between the state of the terminal itself sensed by the sensor unit and the state initial value.

Further, in the communication method according to the present invention, illuminance of the light observed either when the illuminance of the light of the optical modulation signal is largest or when the signal intensity of the electrical signal is largest is used as an illuminance initial value, a sensed value sensed by the sensor unit either when the illuminance of the light of the optical modulation signal is largest or when the signal intensity or the electrical signal is largest is used as a state initial value, the illuminance threshold value is set on a basis of the illuminance initial value, and the electrical signal is corrected on a basis of a difference between the state of the terminal and the state initial value.

To make the aforementioned correction, a reference value is required. Accordingly, in the present invention, the sensed value sensed by the sensor unit when the terminal is in the state of having the largest reception illuminance is used as the initial value (the reference value). In actual optical wireless communication, when the reception illuminance becomes lower, the correction unit calculates how much a sensed value sensed by the sensor unit has changed from the initial value, so as to correct the electrical signal in an amount corresponding to the change amount. Consequently, the present invention makes it possible to dynamically change the correction amount in accordance with the state of the terminal.

When the optical receiver is unable to receive the optical modulation signal although the terminal is present in a range of the optical wireless communication, the correction circuit of the terminal in the communication system according to the present invention does not carry out one selected from between: comparison between the illuminance of the light received from the optical transmitter by the optical receiver and the illuminance initial value; and comparison between the signal intensity of the electrical signal output by the optical receiver and the intensity threshold value.

Even in the range of the RF wireless communication, the terminal may not be able, in some situations, to receive any optical signal used in optical wireless communication at all, depending on what state the terminal is in. The present communication system, however, is able to continue the RF wireless communication even in those situations.

The present invention provides a program for causing a computer to function as the terminal. It is possible to realize the terminal according to the present invention by using the computer and the program. The program may be recorded on a recording medium or may be provided via a network.

It is possible to combine any of the above inventions as well as possible.

Effects of the Invention

The present invention is able to provide the communication system, the terminal, the communication method, and the program capable of improving the probability of successful authentication regardless of mobility of the terminal.

DESCRIPTION OF EMBODIMENTS

Embodiments of the present invention will be explained, with reference to the accompanying drawings. The embodiments described below are examples of the present invention, and the present invention is not limited to the embodiments described below. In the present description and the drawings, some of the constituent elements having mutually the same reference characters represent the same elements as each other.

First Embodiment

Figure 1:
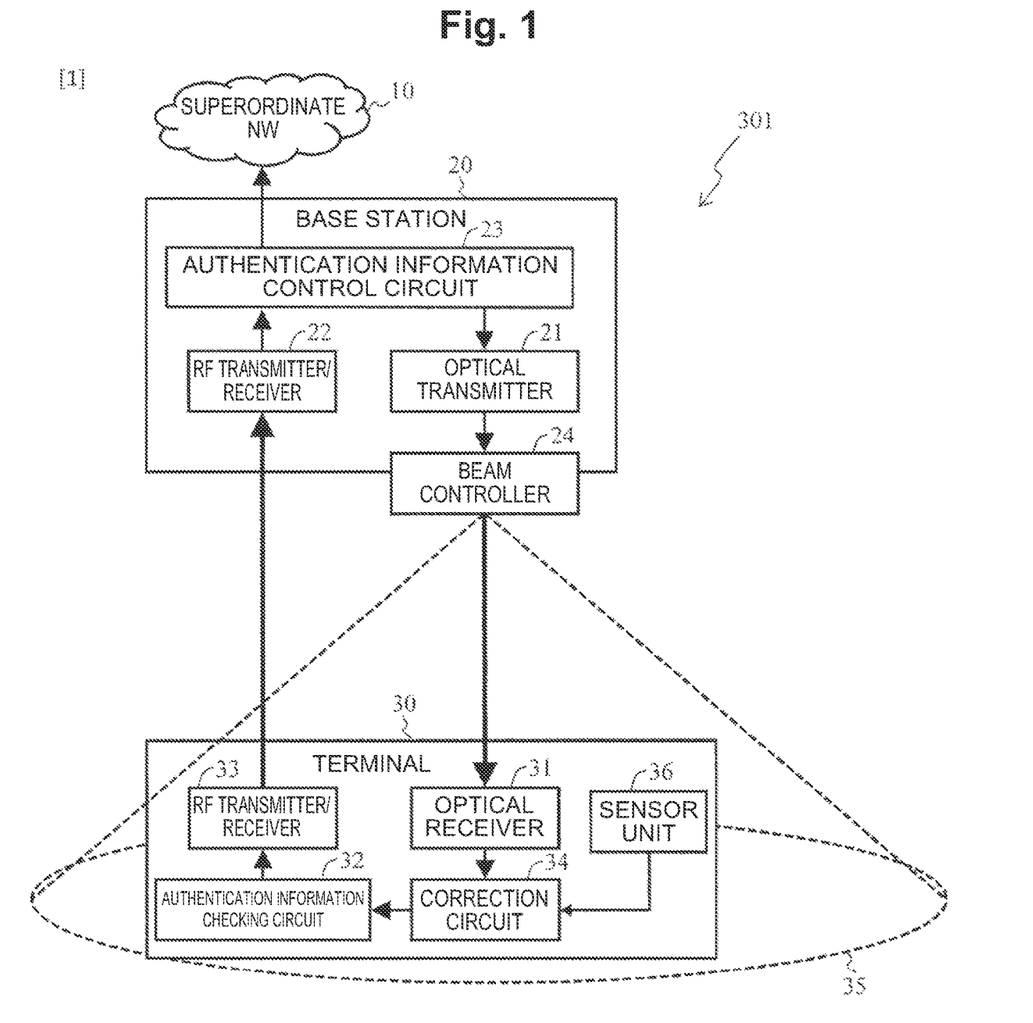
FIG. 1 is a diagram for explaining a communication system according to the present invention.

FIG. 1 is a diagram for explaining a communication system 301 of the present embodiment. The communication system 301 is a communication system in which a base station 20 and a terminal 30 communicate with each other via optical wireless communication and RF wireless communication.

The base station 20 includes:
an optical transmitter 21 that transmits, as an optical modulation signal, authentication information for permitting communication via the RF wireless communication to the terminal 30 via the optical wireless communication;
a base-station-side RF transmitter/receiver 22 that receives the authentication information transmitted from the terminal 30 via the RF wireless communication and that transmits and receives communication data communicated between the terminal 30 and a network 10 to and from the terminal 30 via the RF wireless communication; and
an authentication information control circuit 23 that authenticates the terminal 30 which transmitted the authentication information and that permits communication between the authenticated terminal 30 and the network 10.

The terminal 30 includes:
a sensor unit 36 that senses the state of the terminal and includes at least one of an acceleration sensor, a gyro sensor, a position sensor, and a proximity sensor;
an optical receiver 31 that receives the optical modulation signal and outputs an electrical signal;
a correction circuit 34 that corrects the electrical signal on the basis of the state of the terminal sensed by the sensor unit 36 when one of the following is true: the illuminance of the light received from the optical transmitter 21 by the optical receiver 31 is equal to or lower than an illuminance threshold value; and the signal intensity of the electrical signal output by the optical receiver 31 is equal to or lower than an intensity threshold value;
an authentication information checking circuit 32 that checks the authentication information contained in the electrical signal; and
a terminal-side RF transmitter/receiver 33 that transmits the authentication information to the base station 20 via the RF wireless communication and that transmits and receives the communication data communicated with the network 10 to and from the base station 20 via the RF wireless communication.

The communication system 301 transmits the authentication information for permitting the communication via the RF wireless communication as the optical modulation signal, from the base station 20 to the terminal 30 via the optical wireless communication.

The communication system 301 senses the state of the terminal 30 which performs a photoelectric conversion to convert the optical modulation into the electrical signal, by using the sensor unit 36 that is provided for the terminal 30 and that includes at least one of an acceleration sensor, a gyro sensor, a position sensor, and a proximity sensor.

The communication system 301 corrects the electrical signal on the basis of the state of the terminal 30 when one of the following is true: the illuminance of the light of the optical modulation signal is equal to or lower than the illuminance threshold value; and the signal intensity of the electrical signal is equal to or lower than the intensity threshold value.

The communication system 301 extracts the authentication information from the corrected electrical signal and causes the authentication information to be transmitted from the terminal 30 to the base station 20 via the RF wireless communication.

The communication system 301 authenticates, by using the base station 20 that received the authentication information transmitted from the terminal 30 via the RF wireless communication, the terminal 30 that transmitted the authentication information, so as to permit the communication between the authenticated terminal 30 and the network 10.

The authentication information control circuit 23 manages the authentication information for using the RF wireless communication. The authentication information may be a Service Set Identifier (SSID), an identification number (ID), a password (PW), or any of other types of information. The authentication information control circuit 23 checks to see whether the authentication information transmitted from the terminal 30 matches authentication information stored therein and permits the terminal 30 of which the authentication information matched to communicate with the superordinate network 10.

The optical transmitter 21 uses a light source of an LED or the like that is dimmable or color-adjustable. The light source may also be used for illuminating purposes. The optical transmitter 21 converts the authentication information from the authentication information control circuit 23 into the optical modulation signal modulated by using a prescribed modulation method.

A beam adjuster 24 controls the beam shape of the optical signal from the optical transmitter 21 so that the optical signal is able to reach a prescribed area 35 and sends the optical signal into a space. When there is no obstacle that blocks the light, the optical signal reaches all the terminals 30 present in the prescribed area 35. When there is an obstacle, the optical signal is unable to reach the terminals 30.

The optical receiver 31 of the terminal 30 converts the optical modulation signal from the optical transmitter 21 into the electrical signal. The optical receiver 31 does not necessarily have to be an optical receiver dedicated for optical wireless communication. When the terminal 30 is a smartphone, a camera function (an image sensor) or an illuminance sensor may be used.

The sensor unit 35 includes an least one of an acceleration sensor, a gyro sensor, a position sensor, and a proximity sensor. The acceleration sensor detects the orientation of the terminal 30. The gyro sensor detects the tilt of the terminal 30. The position sensor detects the position of the terminal 30. The proximity sensor detects one or more objects present in the surroundings of the terminal 30. The "state of the terminal" denotes information indicating the orientation of the terminal 30, the tilt of the terminal 30, the position of the terminal 30, and/or whether an object is present in the surroundings of the terminal 30 (including the distance between the terminal and the object).

When the illuminance of the optical modulation signal or the intensity of the electrical signal resulting from the photoelectric conversion performed on the optical modulation signal is equal to or lower than a threshold value, the correction circuit 34 corrects either the sensitivity of the optical receiver or the electrical signal on the basis of the state of the terminal. The threshold value may be set in advance. Operations of the correction circuit 34 will be explained later.

The authentication information checking circuit 32 checks the authentication information in the electrical signal. The authentication information checking circuit 32 outputs the authentication information by using a protocol of RF wireless communication for which connection is desired or RF wireless communication designated in the information attached to the authentication information.

The RF transmitter/receiver 33 and the RF transmitter/receiver 22 transmit and receive RF wireless signals by using the protocol. The protocol may be Wi-Fi or LTE. For example, the Wi-Fi scheme may be compliant with a plurality of wireless standards such as 2.4 GHz/5 GHz. Between the RF transmitter/receiver 33 and the RF transmitter/receiver 22, the authentication information checked by the authentication information checking circuit 32 is transmitted from the terminal 30 to the base station 20.

The authentication information control circuit 23 permits the terminal 30 of which the authentication information has been confirmed to match to communicate with the superordinate NW 10. Accordingly, the communication system 301 is able to make the RF wireless communication possible only while the light (the VLC light) from the base station is reaching the terminal 30 (only when the terminal 30 is present in the area 35).

[Details of the Correction Circuit]

Figure 2:
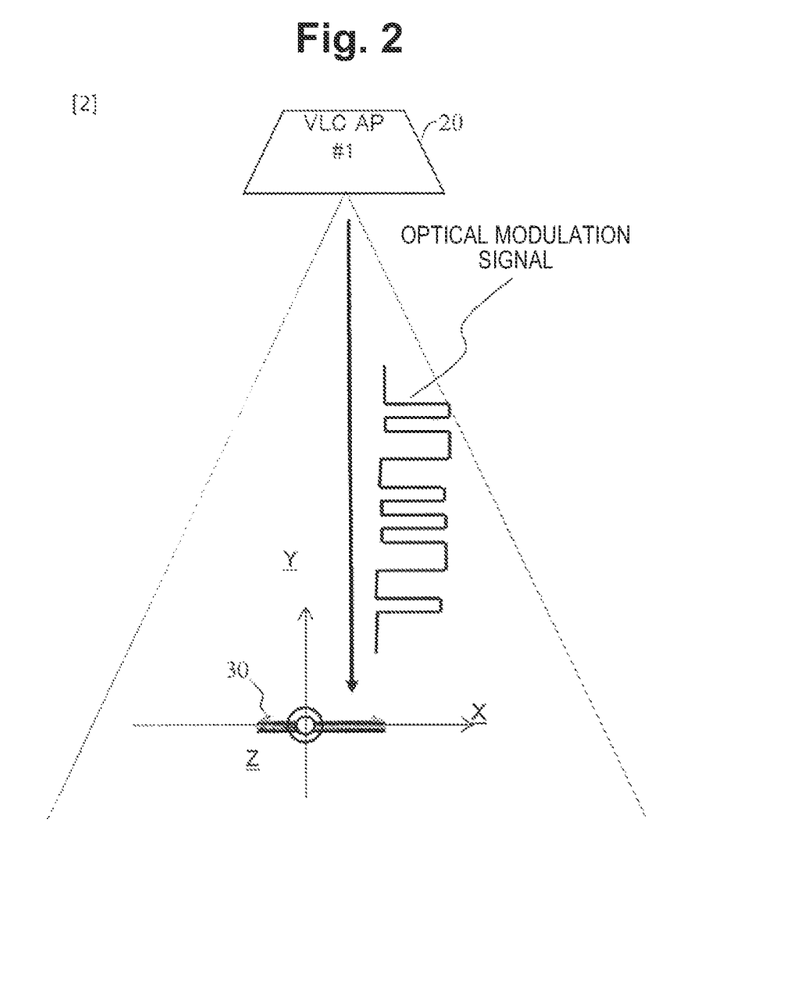
FIG. 2 is a drawing for explaining acquisitions of values in the communication system according to the present invention.

Next, operations of the correction circuit 34 will be explained, with reference to FIG. 2.

As an illuminance initial value, the correction circuit 34 uses the illuminance of the light observed either when the illuminance of the light received from the optical transmitter 21 by the optical receiver 31 is largest or when the signal intensity of the electrical signal output by the optical receiver 31 is largest.

As a state initial value, the correction circuit 34 uses a sensed value sensed by the sensor unit 36 either when the illuminance of the light received from the optical transmitter by the optical receiver 31 is largest or when the signal intensity of the electrical signal output by the optical receiver 31 is largest.

The correction circuit 34 sets the illuminance threshold value on the basis of the illuminance initial value.

The correction circuit 34 corrects the electrical signal on the basis of a difference between the state of the terminal sensed by the sensor unit 36 and the state initial value.

In the communication system 301, depending on the orientations and the tilts of the optical transmitter 21 (the VLC light source) and the terminal 30, the communication may be disconnected if an illuminance threshold value or an intensity threshold is provided, when the light amount received by the optical receiver 31 has decreased even though the terminal 30 is present in the area 35 where the RF wireless communication is possible. The orientation of the terminal 30 denotes a rotation around the X-axis or the Z-axis as shown in FIG. 2.

For this reason, in the communication system 301, the correction is made on the sensitivity of the optical receiver 31 or the electrical signal output by the optical receiver 31. To make the "correction", a reference value is required. For this purpose, the communication system 301 uses the illuminance observed when the light receiving surface (the optical receiver 31) of the terminal 30 opposes the VLC-AP (the optical transmission unit 21), which is the time expected to have the largest illuminance value, as the illuminance initial value and uses the state of the terminal 30 at that time as the state initial value. In other words, the state initial value is the sensed value sensed by the sensor unit 36 while the terminal is in the state expected to have the largest illuminance of the light received by the optical receiver 31.

In this situation, the correction circuit 34 sets the illuminance threshold value or the intensity threshold value on the basis of the illuminance initial value. For example, the illuminance threshold value may be 80% of the illuminance initial value. The intensity threshold value may be set in advance. Alternatively, the intensity threshold value may be determined by obtaining the intensity of the electrical signal corresponding to the illuminance initial value and calculating 80% of the obtained intensity.

Specifically, after starting up an application of the terminal 30 within the area 35, the user tilts the terminal 30 so that the image sensor (a camera lens) or the illuminance sensor is oriented toward the VLC light source (the optical transmission unit 21). In that state, the light receiving surface (the optical receiver 31) of the terminal 30 and the VLC-AP (the optical transmission unit 21) oppose each other, which makes the reception illuminance the largest. The application obtains the illuminance from the image sensor or the illuminance sensor and uses the obtained illuminance as the illuminance initial value. The application obtains the angle and the acceleration from the gyro sensor and the acceleration sensor and uses the obtained values as state initial information.

Alternatively, the illuminance initial value and the state initial value may each be a value set in advance. In another example, the largest illuminance value obtained during a specific time period after the application is started up may be used as an illuminance initial value, and the angle and the acceleration observed at that time may be used as state initial information.

Figure 3:
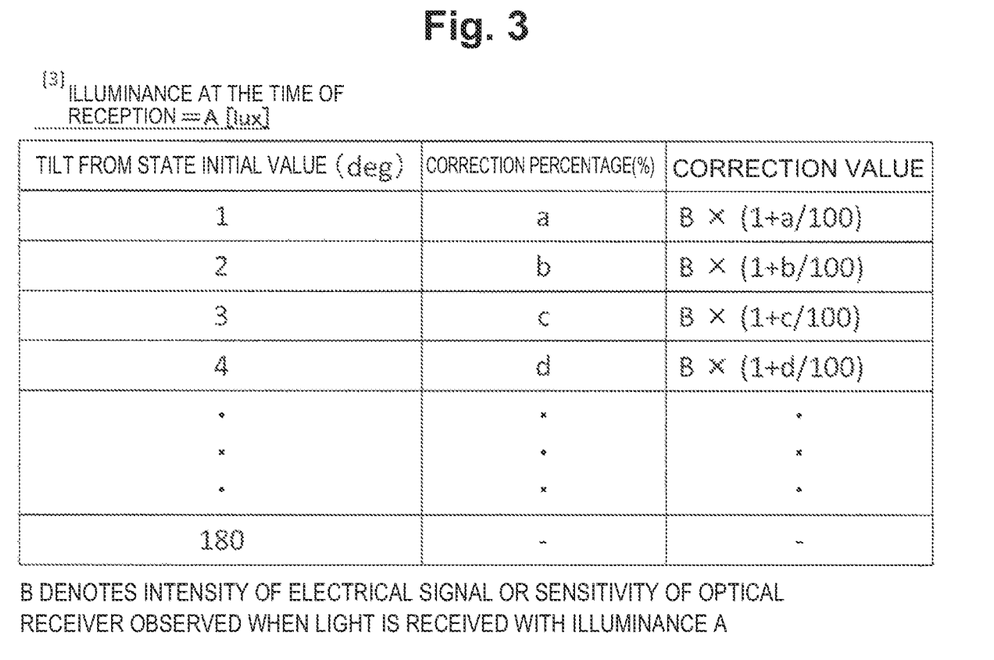
FIG. 3 As a drawing for explaining a table provided in the communication system according to the present invention.

FIG. 3 is a drawing for explaining an example of the correction calculation performed by the correction circuit 34. The correction circuit 34 includes a table as shown in FIG. 3. For example, the illuminance observed when the optical receiver 31 receives the optical modulation signal is expressed as A [lux]. The correction circuit 34 obtains the present state of the terminal from the sensor unit 36 and compares the obtained state with the state initial value. As a result, information is obtained regarding how much the present terminal state is tilted with respect to the state initial value. The obtained information is looked up from the table in FIG. 3, so as to detect a correction percentage and to calculate a correction value. In the present example, the correction percentages are set in advance. After that, the correction circuit 34 applies the calculated correction value to the electrical signal or the sensitivity of the optical receiver 31.

Figure 4:
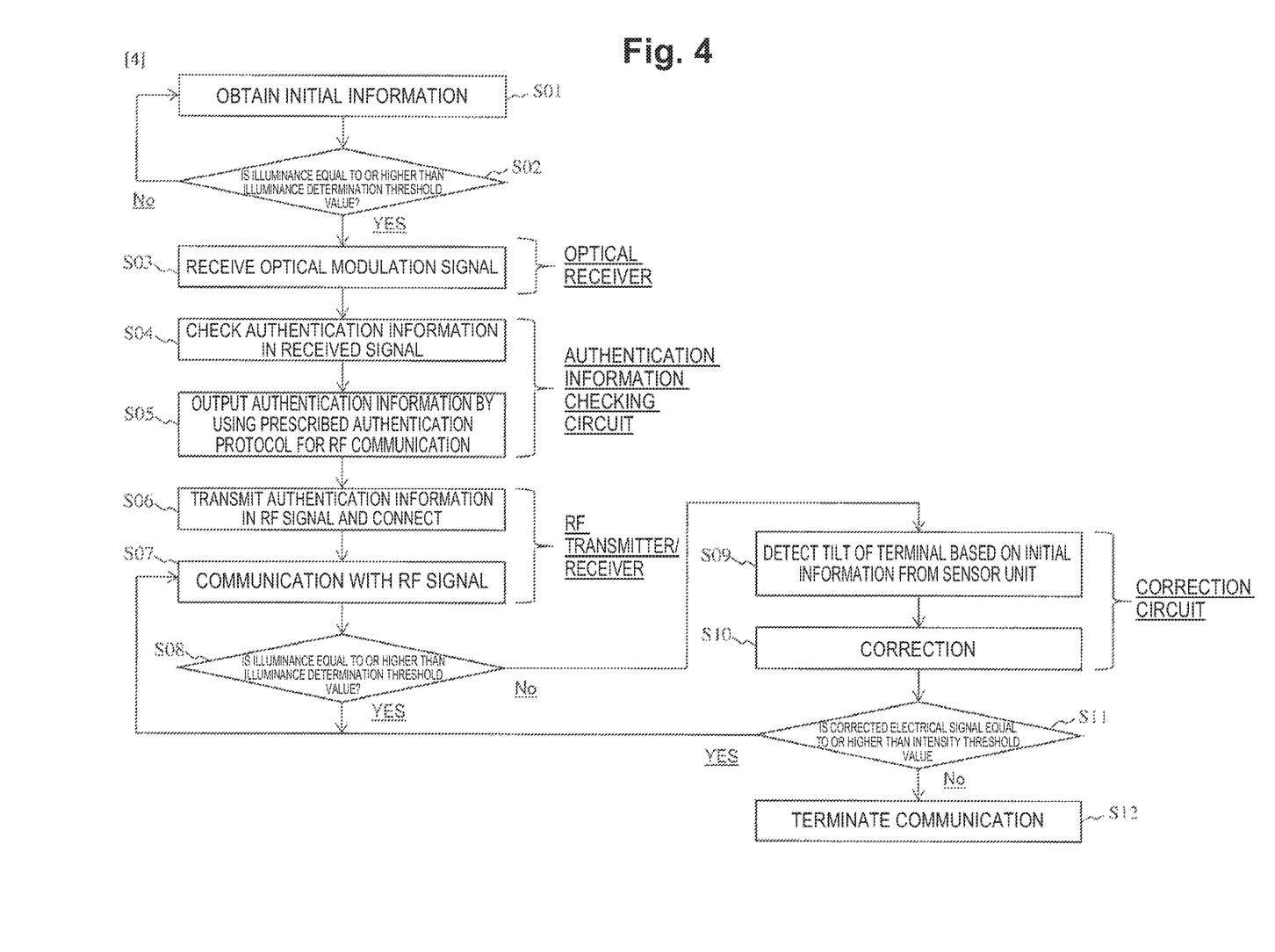
FIG. 4 is a chart for explaining a communication method according to the present invention.

FIG. 4 is a chart for explaining a communication method implemented by the communication system 301. After the user starts up the application of the terminal 30, initial information is obtained (step S01). The initial information denotes the illuminance initial value and the state initial value. As explained above, as a result of the user causing the light receiving surface (the surface on which the camera lens or the illuminance sensor is installed) of the terminal 30 to be oriented toward the base station 20 (toward the light source), it is possible to obtain the initial information. In this situation, when the illuminance is not sufficient (step S02: "No"), the process at step S01 is tried again, by trying changing the orientation of the light receiving surface of the terminal 30, trying approaching the light source (trying entering the area 35), or trying to move to a location where the light from the light source is not blocked. When the illuminance is satisfactory, the terminal 30 receives the optical modulation signal by employing the optical receiver 31 (step S03). Because the illuminance is equal to or higher than the illuminance threshold value, the correction circuit 34 makes no correction, and the authentication information checking circuit 32 checks the authentication information in the optical modulation signal received by the optical receiver 31 (step S04). The authentication information checking circuit 32 outputs the authentication information to the RF transmitter/receiver 33, by using a prescribed authentication protocol for the RF communication (step S05). The RF transmitter/receiver 33 transmits the authentication information to the base station 20 via the RF wireless communication (step S06). The base station 20 checks to see the authentication information matches and permits the terminal 30 to communicate with the superordinate network 10 (step S07).

The correction circuit 34 regularly checks to see whether the illuminance of the light received by the optical receiver exceeds the illuminance threshold value. When the illuminance of the light exceeds the illuminance threshold value, the correction circuit 34 does not correct the electrical signal (step S08: "Yes"). The communication between the terminal 30 and the superordinate network 10 is continued. On the contrary, when the illuminance of the light becomes lower than the illuminance threshold value (step S08: "No"), because there is an obstacle between the base station 20 and the terminal 30 or the user has moved to a different location, or some other reason, the correction circuit 34 obtains information about the state of the terminal from the sensor unit 36 and compares the obtained information with the state initial value (step S09). For example, the correction circuit 34 detects the difference between the present tilt of the terminal and the state initial value and calculates a correction value by looking up the detected difference from the table in FIG. 3.

After that, the correction circuit 34 makes a correction by raising the sensitivity of the optical receiver, amplifying the electrical signal, or the like (step S10). After making the correction, the correction circuit 34 checks to see whether the electrical signal exceeds the intensity threshold value (step S11). When the electrical signal exceeds the intensity threshold value the communication between the terminal 30 and the superordinate network 10 is continued (step S11: "Yes"). On the contrary, when the electrical signal does not exceed the intensity threshold value (step S11: "No"), the communication between the terminal 30 and the superordinate network 10 is terminated (step S12).

Second Embodiment

When the optical receiver 31 is unable to receive the optical modulation signal although the terminal 30 is present in the area 35, the correction circuit 34 does not carry out one selected from between: the comparison between the illuminance of the light received from the optical transmitter 21 by the optical receiver 31 and the illuminance initial value; and the comparison between the signal intensity of the electrical signal output by the optical receiver 31 and the intensity threshold value.

Figure 5:
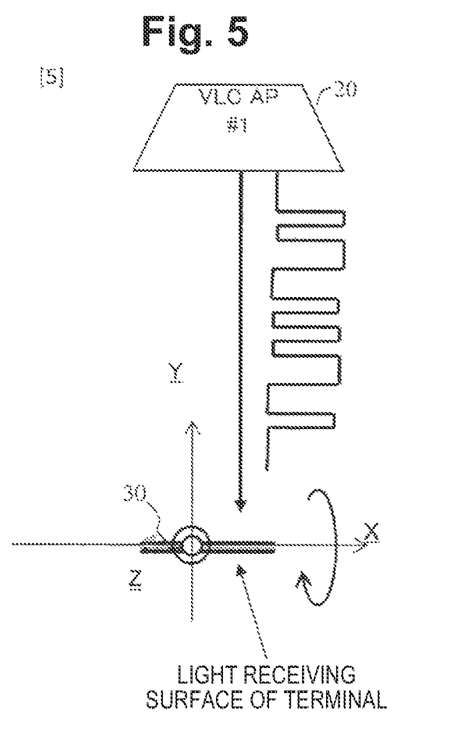
FIG. 5 is a drawing for explaining an operation of the communication system according to the present invention.

This configuration will be explained more specifically. FIG. 5 is a drawing for explaining a situation in which the operation of the present embodiment is performed. The light receiving surface of the terminal 30 is oriented in the opposite direction from the base station 20 (is tilted by 180° with respect to the VLC light source while being centered on the X-axis direction) and is therefore not able to receive any of the optical modulation signal from the optical transmitter 21. In this state, the correction circuit 34 is unable to make the correction. For this reason, the terminal 30 uses position information obtained by the position sensor (e.g., a GPS) in the sensor unit 36. The terminal 30 compares the position information from the position sensor with information about the position in which the base station 20 is installed and determines whether the terminal 30 is present inside the area 35 or outside the area 35. For example, being within a 10-meter radius of the position information obtained by the GPS is determined as being inside the area 35 of the base station 20. It is therefore determined that the terminal 30 is able to connect to the base station 20 via the RF wireless communication. In that situation, the processes at step S08 and thereafter in FIG. 4 will not be performed.

Third Embodiment

Figure 6:
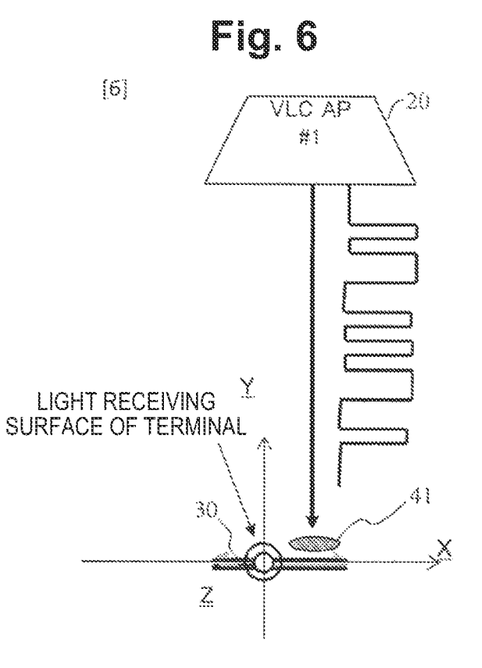
FIG. 6 is a drawing for explaining operation of the communication system according to the present invention.

FIG. 6 is a drawing for explaining a situation in which an obstacle 41 such as a hand has approached the light receiving surface of the terminal 30. In this situation, the optical receiver 31 of the terminal 30 is shielded from the light from the optical transmitter 21 and is thus unable to receive the optical modulation signal. Therefore, although the terminal 30 is present the area 35, the terminal 30 is unable to transmit the authentication information to the base station 20, which would lead to the situation where the RF wireless communication is terminated. In the present embodiment, the terminal 30 uses information from the proximity sensor in the sensor unit 36. When the proximity sensor detects that the obstacle 41 has approached the light receiving surface of the terminal 30, because the obstacle 41 is making it impossible to receive the optical modulation signal, the terminal 30 determines that it is possible to connect to the base station 20 via the RF wireless communication. In that situation, the processes at step S08 and thereafter in FIG. 4 will not be performed.

Fourth Embodiment

It is possible to realize the terminal 30 by using a computer and a program. The program may be recorded on a recording medium or may be provided via a network.

Figure 7:
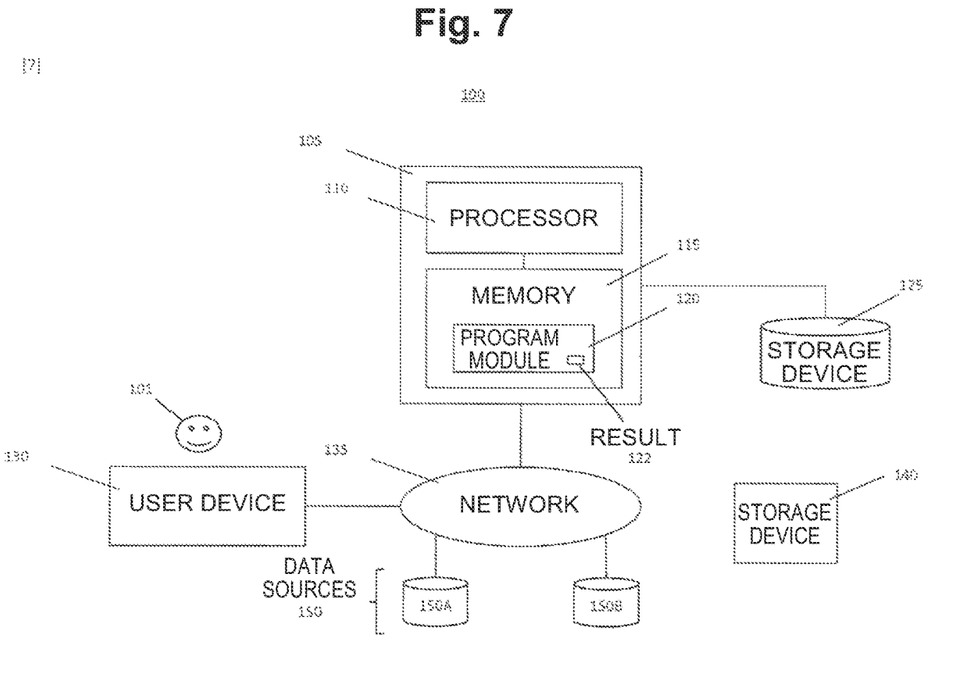
FIG. 7 is a drawing for explaining a terminal according to the present invention.

FIG. 7 is a block diagram of a system 100. The system 100 includes a computer 105 connected to a network 135.

The network 135 is a data communication network. The network 135 may be a private network or a public network. The network 135 may include any or all of the following: (a) a personal area network covering, for example, a certain room; (b) a local area network covering, for example, a certain building; (c) a campus area network covering, for example, a certain campus; (d) a metropolitan area network covering, for example, a certain city; (e) a wide area network covering, for example, areas joined across the border between cities, regions, or nations; and (f) the Internet. The communication is performed by using an electronic signal and an optical signal via the network 135.

The computer 105 includes a processor 110 and a memory 115 connected to the processor 110. In the present description, the computer 105 is expressed as a stand-alone device, but is not limited to this example. The computer 105 may be connected to one or more other devices that are not shown in a distributed processing system.

The processor 110 is an electronic device configured with a logic circuit that responds to instructions and that executes instructions.

The memory 115 is a tangible computer-readable storage medium that has a computer program encoded therein. In this regard, to control operations of the processor 110, the memory 115 has stored therein data and instructions (i.e., program codes) that are readable and executable by the processor 110. It is possible to realize the memory 115 by using a Random Access Memory (RAM), a hard drive, a Read-Only Memory (ROM), or a combination of any of these. On of the constituent elements of the memory 115 is a program module 120.

The program module 120 includes instructions for controlling the processor 110 so as to execute the processes described in the present description. In the present description, the operations are described as being performed by the computer 105 or one of a method, processes, and subordinate processes thereof. However, these operations are, in actuality, performed by the processor 110.

In the present description, the term "module" is used to denote a functional operation that can be embodied as a stand-alone constituent element or a structure put together with a plurality of subordinate constituent elements. Accordingly, the program module 120 may be realized as a single module or a plurality of modules working in collaboration with one another. Further, in the present description, the program module 120 is described as being installed in the memory 115 and being thus realized with software; however, it is possible to realize the program module 120 by using hardware (e.g., an electronic circuit), firmware, software, or a combination of any of these.

Although the program module 120 is indicated as having already been loaded in the memory 115, the program module 120 may alternatively be present in a storage device 140 so as to be later loaded into the memory 115. The storage device 140 is a tangible computer readable storage medium that has stored therein the program module 120. Examples of the storage device 140 include a compact disk, a magnetic tape, a read-only memory, an optical storage medium, a hard drive, a memory unit structured with a plurality of parallel hard drives, and a Universal Serial Bus (USB)) flash drive. Alternatively, the storage device 140 may be a random access memory or any of other types of electronic storage devices that are provided in a remote storage system (not shown) and can be connected to the computer 105 via the network 135.

The system 100 further includes a data source 150A and a data source 150B (which will collectively be referred to as data sources 150 in the present description) that are communicably connected to the network 135. In actuality, the data sources 150 may include an arbitrary number (i.e., one or more) of data sources. The data sources 150 include non-systemized data and may include social media.

The system 100 further includes a user device 130 that is operated by a user 101 and is connected to the computer 105 via the network 135. Examples of the user device 130 include a keyboard that enables the user 101 to transmit information and command selections to the processor 110 and an input device such as a speech recognition sub-system. The user device 130 further includes a display device or an output device such as a printer or a voice synthesis device. A cursor control unit such as a mouse, a trackball, or a touch-sensitive screen enables the user 101 to operate a cursor on a display device so as to transmit other information and command selections to the processor 110.

The processor 110 outputs a result 122 of executing the program module 120 to the user device 130. Alternatively, the processor 110 may bring the output to a storage device 125 such as a database or a memory, for example, or may bring the output to a remote device (not shown) via the network 135.

For example, the program that executes the flowchart in FIG. 4 may be configured as the program module 120. It is possible to cause the system 100 to operate as the terminal 30.

The terms "comprising" and "including" indicate the presence of a characteristic, a complete body, a step, or a constituent element being referenced, but should be construed as not excluding the presence or one or more other characteristics, complete bodies, steps, and constituent elements, or a group consisting of any of these. The words "a" and "an" are the indefinite articles and are therefore not meant to exclude embodiments including two or more of the referenced subjects.

[Notes]

Figure 8:
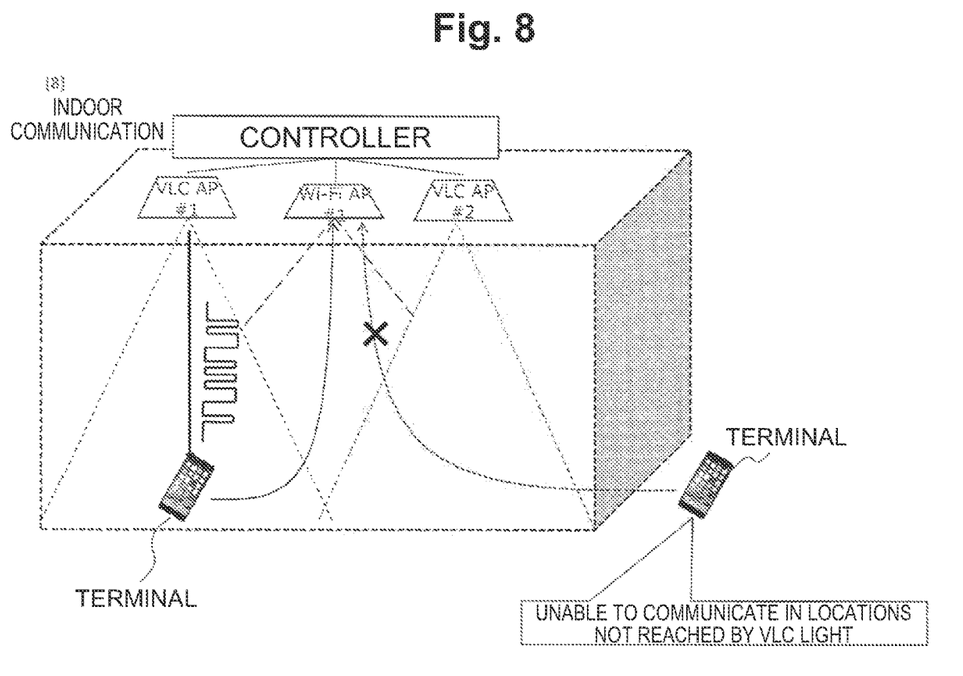
FIG. 8 is drawing for explaining the communication system according to the present invention.

The following and FIG. 8 will explain a communication system of the present embodiment. According to conventional techniques, a user who wishes to use Wi-Fi needs to search for a connectable access point AP by using an SSID and to input a password. After that, a procedure is taken so that a terminal is authenticated on the Wi-Fi side by using the input password or the like, to complete the connection process. In relation to this, a hybrid system of RF and light where Wi-Fi can easily be used had been proposed (e.g., Patent Literature 1) in which, by utilizing the characteristic of light being visible (that can be seen), it is possible to save the trouble of "searching with an SSID and inputting a password" by holding a receiver (e.g., a camera) of the terminal against the light.

In the abovementioned hybrid system, it is possible to construct a secure local area network, by making the Wi-Fi connection possible only in such an area where the light from a VLC-AP reaches (limiting the communication area). In this hybrid system, reception characteristics significantly vary depending on the distance between a VLC light source and an optical detector provided on the terminal side, as well as the angle or the tilt between the VLC light source and the optical detector provided on the terminal side. In the worst case, an authentication error may occur. When mobility of the terminal is taken into consideration, it is expected that such an "authentication error" occurs more prominently, even when the terminal is present in the communication area.

To solve this problem, the present invention provides the communication control method by which a terminal is authenticated/certified within an area, by integrally using the feature value (e.g., the posture of the terminal) obtained by acquiring the signal from the optical wireless link while using the group of sensors installed on the terminal side. By using the simple method and with a high level of precision, the present invention is able to realize the wireless communication system capable of enhancing convenience of Wi-Fi and making Wi-Fi communication possible only in a specific area.

REFERENCE SIGNS LIST

10 Superordinate Network
20 Base Station
21 Optical Transmitter
22 RF Transmitter/Receiver
23 Authentication Information Control Circuit
24 Beam Controller
30 Terminal
31 Optical Receiver 32 Authentication Information Checking Circuit
33 RF Transmitter/Receiver
34 Correction Circuit
35 Area
36 Sensor Unit
301 Communication System

The invention claimed is:

1. A communication system in which a base station and a terminal communicate with each other via optical wireless communication and Radio Frequency (RF) wireless communication, wherein
the base station comprises:
an optical transmitter that transmits, as an optical modulation signal, authentication information for permitting communication via the RF wireless communication to the terminal via the optical wireless communication;
a base-station-side RF transmitter/receiver that receives the authentication information transmitted from the terminal via the RF wireless communication and that transmits and receives communication data communicated between the terminal and a network to and from the terminal via the RF wireless communication; and
an authentication information control circuit that authenticates the terminal which transmitted the authentication information and that permits communication between the authenticated terminal and the network, and
the terminal comprises:
a sensor unit that senses a state of the terminal and includes at least one of an acceleration sensor, a gyro sensor, a position sensor, and a proximity sensor;
an optical receiver that receives the optical modulation signal and outputs an electrical signal;
a correction circuit that corrects the electrical signal on a basis of the state of the terminal sensed by the sensor unit when one of the following is true: illuminance of light received from the optical transmitter by the optical receiver is equal to or lower than an illuminance threshold value; and a signal intensity of the electrical signal output by the optical receiver is equal to or lower than an intensity threshold value;
an authentication information checking circuit that checks the authentication information contained in the electrical signal; and
a terminal-side RF transmitter/receiver that transmits the authentication information to the base station via the RF wireless communication and that transmits and receives communication data communicated with the network to and from the base station via the RF wireless communication.

2. The communication system according to claim 1, wherein
the correction circuit of the terminal uses, as an illuminance initial value, illuminance of the light observed either when the illuminance of the light received from the optical transmitter by the optical receiver is largest or when the signal intensity of the electrical signal output by the optical receiver is largest,
the correction circuit uses, as a state initial value, a sensed value sensed by the sensor unit either when the illuminance of the light received from the optical transmitter by the optical receiver is largest or when the signal intensity of the electrical signal output by the optical receiver is largest,
the correction circuit sets the illuminance threshold value on a basis of the illuminance initial value, and
the correction circuit corrects the electrical signal on a basis of a difference between the state of the terminal sensed by the sensor unit and the state initial value.

3. The communication system according to claim 2, wherein when the optical receiver is unable to receive the optical modulation signal although the terminal is present in a range of the optical wireless communication, the correction circuit of the terminal does not carry out one selected from between: comparison between the illuminance of the light received from the optical transmitter by the optical receiver and the illuminance initial value; and comparison between the signal intensity of the electrical signal output by the optical receiver and the intensity threshold value.

4. A terminal that communicates with a base station via optical wireless communication and RF wireless communication, the terminal comprising:
a sensor unit that senses a state of the terminal and includes at least one of an acceleration sensor, a gyro sensor, a position sensor, and a proximity sensor;
an optical receiver that receives an optical modulation signal being transmitted from the base station via the optical wireless communication and containing authentication information for permitting communication via the RF wireless communication and that outputs an electrical signal;
a correction circuit that corrects the electrical signal on a basis of the state of the terminal sensed by the sensor unit when one of the following is true: illuminance of light received from the base station by the optical receiver is equal to or lower than an illuminance threshold value; and a signal intensity of the electrical signal output by the optical receiver is equal to or lower than an intensity threshold value;
an authentication information checking circuit that checks the authentication information contained in the electrical signal; and
a terminal-side RF transmitter/receiver that transmits the authentication information to the base station via the RF wireless communication and that transmits and receives communication data communicated with the network to and from the base station via the RF wireless communication.

5. The terminal according to claim 4, wherein
the correction circuit uses, as an illuminance initial value, illuminance of the light observed either when the illuminance of the light received from an optical transmitter by the optical receiver is largest or when the signal intensity of the electrical signal output by the optical receiver is largest,
the correction circuit uses, as a state initial value, a sensed value sensed by the sensor unit either when the illuminance of the light received from the optical transmitter by the optical receiver is largest or when the signal intensity of the electrical signal output by the optical receiver is largest,
the correction circuit sets the illuminance threshold value on a basis of the illuminance initial value, and
the correction circuit corrects the electrical signal on a basis of a difference between the state of the terminal sensed by the sensor unit and the state initial value.

6. A non-transitory computer-readable medium having computer-executable instructions that, upon execution of the instructions by a processor of a computer, cause the computer to function as the terminal according to claim 4.

7. A communication method for causing a base station and a terminal to communicate with each other via optical wireless communication and RF wireless communication, the communication method comprising:
- causing authentication information for permitting communication via the RF wireless communication to be transmitted as an optical modulation signal from the base station to the terminal via the optical wireless communication;
- sensing a state of the terminal which performs a photoelectric conversion to convert the optical modulation signal into an electrical signal, by using a sensor unit that is provided for the terminal and that includes at least one of an acceleration sensor, a gyro sensor, a position sensor, and a proximity sensor;
- correcting the electrical signal on a basis of the state of the terminal when one of the following is true: illuminance of light of the optical modulation signal is equal to or lower than an illuminance threshold value; and a signal intensity of the electrical signal is equal to or lower than an intensity threshold value;
- extracting the authentication information from the corrected electrical signal and causing the authentication information to be transmitted from the terminal to the base station via the RF wireless communication; and
- causing the base station that received the authentication information transmitted from the terminal via the RF wireless communication to authenticate the terminal that transmitted the authentication information and to permit communication between the authenticated terminal and a network.

8. The communication method according to claim 7, wherein illuminance of the light observed either when the illuminance of the light of the optical modulation signal is largest or when the signal intensity of the electrical signal is largest is used as an illuminance initial value,
- a sensed value sensed by the sensor unit either when the illuminance of the light of the optical modulation signal is largest or when the signal intensity of the electrical signal is largest is used as a state initial value, the illuminance threshold value is set on a basis of the illuminance initial value, and
- the electrical signal is corrected on a basis of a difference between the state of the terminal and the state initial value.

* * * * *